United States Patent
Tsutsumi et al.

(10) Patent No.: US 6,514,907 B2
(45) Date of Patent: Feb. 4, 2003

(54) BROMINE-IMPREGNATED ACTIVATED CARBON AND PROCESS FOR PREPARING THE SAME

(75) Inventors: Yoshio Tsutsumi, Takatsuki (JP); Teruo Fukui, Nara (JP); Katsuya Noguchi, Toyonaka (JP); Takashi Kobayashi, Nishinomiya (JP); Ayako Kobayashi, Nishinomiya (JP); Tsuyoshi Yoshidome, Osaka (JP)

(73) Assignee: Takeda Chemical Industries, Ltd., Osaka (JP)

( * ) Notice: Subject to any disclaimer, the term of this patent is extended or adjusted under 35 U.S.C. 154(b) by 0 days.

(21) Appl. No.: 09/121,836

(22) Filed: Jul. 24, 1998

(65) Prior Publication Data

US 2001/0002387 A1 May 31, 2001

(30) Foreign Application Priority Data

Jul. 25, 1997 (JP) .............................................. 9-200371
Oct. 29, 1997 (JP) .............................................. 9-297440

(51) Int. Cl.⁷ .............................................. C01B 31/08
(52) U.S. Cl. ....................................... 502/417; 502/416
(58) Field of Search .............................. 502/417, 416; 428/408, 403

(56) References Cited

U.S. PATENT DOCUMENTS 4,234,460 A * 11/1980 Nishimura et al. ......... 502/417
4,256,773 A * 3/1981 Itoga et al. .................. 426/415
4,394,354 A 7/1983 Joyce .......................... 423/25
5,288,306 A * 2/1994 Aibe et al. ..................... 95/141
5,462,908 A * 10/1995 Liang et al. ................. 502/401

FOREIGN PATENT DOCUMENTS

| GB | 2-88719 | 6/1982 |
| JP | 50-130679 | 10/1975 |
| JP | 54-132470 | 10/1979 |
| JP | 55-51422 | 4/1980 |

OTHER PUBLICATIONS

Database WPIL on Questel, week 8026, London: Derwent Publications Ltd., AN 80–45907 C, Class B01D, JP 50–130679 A (Takeda Chemical IND KK), abstract.

* cited by examiner

*Primary Examiner*—Stuart L. Hendrickson
(74) *Attorney, Agent, or Firm*—Foley & Lardner

(57) ABSTRACT

A bromine-impregnated activated carbon wherein the contents of any alkali metal, any alkali earth metal and iron are not higher than 0.3 wt % and the content of bromine is not lower than 3 wt %, with respect to the weight of a material activated carbon. The bromine-impregnated activated carbon has improved adsorption characteristics to the alkyl sulfides, which have not been sufficiently removed by activated carbons prepared by the conventional techniques. Further, variations in the absorption characteristics can be reduced and the activated carbon can exhibit a stable performance in removing the alkyl sulfides.

5 Claims, No Drawings

BROMINE-IMPREGNATED ACTIVATED CARBON AND PROCESS FOR PREPARING THE SAME

CROSS-REFERENCES TO RELATED APPLICATIONS

This application is related to Japanese applications Nos. Hei 9(1997)-200371 and Hei 9(1997)-297440 filed on Jul. 25, 1997 and Oct. 29, 1997 respectively, whose priorities are claimed under 35 USC § 119, the disclosures of which are incorporated by reference in their entirety.

BACKGROUND OF THE INVENTION

1. Field of the Invention

The present invention relates to a bromine-impregnated activated carbon and a process for preparing the same. More particularly, the bromine-impregnated activated carbon is used for removing alkyl sulfides from gas containing the alkyl sulfides in small concentrations.

2. Description of Related Art

Sulfur compounds such as hydrogen sulfide, mercaptans and alkyl sulfides are contained in exhaust gas from sewage treatment plants, raw sewage treatment plants, waste disposal plants, and process gas and exhaust gas from chemical plants for petroleum refining, petroleum chemistry, paper pulp production and the like and from food processing plants.

Various methods for removing sulfur compounds contained in such gases are conventionally known, including an alkali absorbing method, a wet oxidation method, an ozone oxidation method, an activated carbon adsorption method and a combustion method, for example.

These conventional methods are useful for removing many kinds of sulfur compounds. However, alkyl sulfides such as dimethyl sulfide and dimethyl disulfide, which are specific smelly substances, cannot be removed to a satisfactory extent by the conventional methods.

Under these circumstances, Japanese Unexamined Patent Publications Nos. Sho 54(1979)-132470, Sho 50(1975)-130679 and Sho 55(1980)-51422, for example, propose that dimethyl sulfide and dimethyl disulfide can be removed by chemical adsorption by using a bromine-impregnated activated carbon instead of an usual activated carbon in the adsorption method. The chemical adsorption is a mechanism different from physical adsorption by the usual activated carbon.

Surely, in the case where the bromine-impregnated activated carbon is used, specific smelly substances such as dimethyl sulfide and dimethyl disulfide can be more effectively removed than the conventional activated carbon. However, the bromine-impregnated activated carbon differ in quality depending upon various parameters such as the amount of bromine carried by the activated carbon. Accordingly, in the present situation, dimethyl sulfide and dimethyl disulfide cannot always be removed to a satisfactory degree.

SUMMARY OF THE INVENTION

The present invention provides a bromine-impregnated activated carbon wherein the contents of any alkali metal, any alkali earth metal and iron are not higher than 0.3 wt % and the content of bromine is not lower than 3 wt %.

Further, the present invention provides a process for preparing the bromine-impregnated activated carbon comprising the steps of: reducing the contents of any alkali metal, any alkali earth metal and iron in a material activated carbon to 0.3 wt % or lower; and impregnating the activated carbon with bromine such that the content of bromine is not lower than 3 wt %.

In another aspect, the present invention provides a bromine-impregnated activated carbon, wherein the content of a surface oxide is not higher than 2.5 wt % in terms of oxygen and the activated carbon is impregnated with bromine such that the content of bromine is not lower than 3 wt %.

Further, the present invention provides a process for preparing the bromine-impregnated activated carbon of the above comprising the steps of: thermally treating a raw material activated carbon at 500° C. to 1,100° C. in the absence of oxygen to produce a carrier activated carbon; and impregnating the carrier activated carbon with bromine.

DESCRIPTION OF THE PREFERRED EMBODIMENTS

As a material activated carbon for producing the bromine-impregnated activated carbon of the present invention, usable is any activated carbon prepared from a raw material such as coal, coke, charcoal, coconut shell, resin, petroleum residuum or the like by a known process that has a specific surface area of about 100 $m^2$/g to 2,000 $m^2$/g. The material activated carbon may be in any form such as spherical, cylindrical, crushed, powdery, granular, fibriform or honeycombed form.

The alkali metals and alkali earth metals whose contents in the bromine-impregnated activated carbon of the present invention are controlled include Na, K, Mg, Ca, Zn and the like, for example. In whatever form these metals may be present, e.g., in a free form or in the form of a compound such as an oxide, a carbonate or a chloride, the contents thereof in terms of metals is preferably about 0.3 wt % or lower, more preferably about 0.1 wt % or lower, still more preferably about 0.05 wt % or lower, with respect to the weight of a material activated carbon. Especially, in the cases where the alkali metals and alkali earth metals are in a form which enables them to react with bromine, for example, in a free form, or in the cases where the alkali metals and alkali earth metals are ready to react with bromine, for example, in the form of an oxide (hydroxide) or in the form of an iodide, the contents of such metals are preferably about 0.2 wt % or lower in terms of the metals with respect to the weight of the material activated carbon.

The contents of the alkali metals and alkali earth metals are discussed here in wt % with respect to the material activated carbon. However, as described later, since the impregnation amount of bromine is usually within the range from about 3 wt % to about 50 wt % with respect to the material activated carbon, the contents of the alkali metals and alkali earth metals can be calculated, if necessary, in wt % to the bromine-impregnated activated carbon from the amount of bromine with which the bromine-impregnated activated carbon is impregnated. In this case, the contents of the alkali metals and the alkali earth metals are preferably about 0.3 wt % or lower, more preferably about 0.1 wt % or lower, still more preferably about 0.05 wt % or lower, for example, with respect to the weight of the bromine-impregnated activated carbon.

The content of iron in the material activated carbon is preferably about 0.3 wt % or lower, more preferably about 0.1 wt % or lower, still more preferably about 0.05 wt % or lower, and the content of iron in the bromine-impregnated activated carbon is preferably about 0.3 wt % or lower, more preferably about 0.1 wt % or lower, still more preferably about 0.05 wt % or lower. In the cases where the iron is in a form which enables them to react with bromine or in the cases where the iron is ready to react with bromine, the contents of iron is preferably about 0.2 wt % or lower in terms of the metals with respect to the weight of the material activated carbon.

Further, in the present invention, the bromine-impregnated activated carbon having the controlled contents of the alkali metals, alkali earth metals and iron as described above can exhibit more improved adsorption characteristics if the content of surface oxides is controlled as described below.

In the bromine-impregnated activated carbon of the present invention, the surface oxides whose content is controlled include various kinds of oxides such as carbon-oxygen complex (i.e., carbon monooxide, carbon dioxide), oxides of alkali metals and alkali earth metals. The content of such oxides is preferably about 2.5 wt % or lower, more preferably about 2 wt % or lower, still more preferably about 1.5 wt % or lower, in terms of oxygen with respect to the material activated carbon before the impregnation with bromine. In the bromine-impregnated activated carbon of the present invention, oxidative effect of bromine leads to oxidation of the activated carbon with time. As a result, the surface oxides tend to increase to some extent. Therefore, the content of the surface oxides in the bromine-impregnated activated carbon as finally obtained is controlled as discussed above in terms of weight with respect to the material activated carbon before the impregnation with bromine. In this case, the contents of the alkali metals and the like are preferably controlled, but the content of the surface oxides does not necessarily have relation with the contents of the alkali metals and the like.

The content of bromine in any bromine-impregnated activated carbon accordingly to the present invention is preferably about 3 wt % or higher, more preferably about 5 wt % or higher, still more preferably about 5 wt % or higher and about 50 wt % or lower, most preferably about 5 wt % or higher and about 20 wt % or lower, with respect to the material activated carbon before the impregnation with bromine.

According to the present invention, a method of reducing the contents of the alkali metals and alkali earth metals in the material activated carbon to about 0.3 wt % or lower is not particularly limited. Examples of such treatment methods include a method of dipping the material activated carbon in water or an acid solution, e.g., about 1 to about 10 wt % hydrochloric acid, phosphoric acid, nitric acid, sulfuric acid and organic acid (e.g., formic acid, acetic acid, oxalic acid and the like), and allowing to stand, stirring and/or boiling for a certain time period (e.g., for about 0.1 to about one hour); a method of feeding water or an acid solution into the material activated carbon for a certain time period (e.g., about one to about ten hours) with stirring the material activated carbon; and a method of passing water or an acid solution through a layer of the material activated carbon. These treatments may be carried out once or repeated twice or more. In the case where the material activated carbon is treated with the acid solution, the treatment is preferably followed by washing with water about one to about five times. In the case where the alkali metals and alkali earth metals can be removed (or deactivated) sufficiently only by washing with water, the contents of the alkali metals and alkali earth metals may be reduced to about 0.3 wt % or lower only by washing with water.

In the process for preparing the bromine-impregnated activated carbon of the present invention, in order to keep the content of the surface oxides in the bromine-impregnated activated carbon as finally obtained within the aforesaid range, the content of the surface oxides in the material activated carbon before the impregnation with bromine is preferably about 2.0 wt % or lower, more preferably about 1.5 wt % or lower, still preferably about 1.0 wt % or lower, in terms of oxygen.

In the process for preparing the bromine-impregnated activated carbon of the present invention, the content of the surface oxides in the carrier activated carbon before the impregnation with bromine may be reduced to about 2.0 wt % in terms of oxygen by thermally treating the material activated carbon at 500 to 1,100° C. in the absence of oxygen, for example. This thermal treatment can be performed by various methods such as a high-temperature pyrolysis method and a high-temperature hydrogen reduction method. Alternatively, a liquid-phase reduction method may be utilized besides the thermal treatment in the absence of oxygen, for example. However, for controlling the content of the surface oxides in the material activated carbon efficiently, the high-temperature pyrolysis method and the high-temperature hydrogen reduction method are preferred.

The high-temperature pyrolysis method is a method of thermally treating the material activated carbon in an inert gas such as nitrogen gas, argon gas or the like which does not contain oxygen or in vacuum to thermally decompose oxides. As for temperature for the thermal treatment, the higher, the more efficient. However, since some activated carbons used as the material activated carbon have their pores closed at temperatures over about 1,200° C., the thermal treatment temperature is suitably about 500° C. to about 1,100° C., preferably about 700° C. to about 950° C. A treatment time period can be decided as required according to the amount of the material activated carbon to be treated, and for example, the treatment time period is about 0.1 to about 10 hours.

The high-temperature hydrogen reduction method is a method of thermally treating the material activated carbon in an atmosphere of gas containing hydrogen to reduce oxides, for example. Temperature for this thermal treatment is suitably about 400° C. to about 1,000° C., preferably about 500° C. to about 850° C., more preferably around 700° C. A treatment time period is suitably about 0.1 to about 10 hours.

The liquid-phase reduction method is a method of dipping or mixing/stirring the material activated carbon in a reducing solvent, for example, of hydrazine within the temperature range from room temperature to about 100° C.

One of the above treatment methods may be performed once or repeated twice or more, or different ones of the above treatment methods may be combined in a multi-stage treatment.

Any bromine-impregnated activated carbon according to the present invention can be impregnated with bromine by a per-se known method. For example, the impregnation can be performed by a gas-phase impregnation method of contacting a carrier gas containing bromine gas with the activated carbon treated desirably, by a liquid-phase impregnation method of dipping the treated activated carbon in bromine water, and a spray impregnation method of spraying liquid bromine directly onto the treated activated carbon for impregnation.

Usually, in the gas-phase impregnation method, air, nitrogen gas, carbon dioxide, carbon monooxide or the like is used as the carrier gas, a contact temperature is set at about 150° C. or lower, preferably about 80° C. or lower, and bromine impregnation is continuously carried out using a fluidized bed, moving bed or spraying and mixing bed of the activated carbon, for example. In this method, after the activated carbon is impregnated with bromine by passing the bromine-containing gas, it is preferable to pass the carrier gas alone to remove remaining bromine gas.

In the liquid-phase impregnation method, the activated carbon is dipped in bromine water containing about 1% to about 5% bromine for about one to about ten hours. Or bromine water is passed through/contacted with the activated carbon using a fluid bed, moving bed, fixed bed or spray bed of the activated carbon to impregnate the activated carbon with bromine, followed by separation by filtration and drying. Temperature for this method is preferably about 80° C. or lower, still more preferably about 50° C. or lower.

In the method of spraying liquid bromine for impregnation, liquid bromine, bromine water or the like is sprayed onto the treated activated carbon with stirring the activated carbon, followed by drying, if necessary. Contact temperature for this method is preferably about 50° C. or lower.

In order to adsorb/remove alkyl sulfides, especially dimethyl sulfide and dimethyl disulfide, from gas containing the alkyl sulfides with the bromine-impregnated activated carbon of the present invention, the gas to be treated may be contacted with the bromine-impregnated activated carbon by a known method such as a fixed bed, a moving bed, a fluid bed, a slurry-type or a batch-type contact stirring method, for example. A contact time period in this case can be varied as necessary according to the concentration of the alkyl sulfides, the particle size of the bromine-impregnated activated carbon used, the contact method and the like, but usually for about 0.1 seconds to about one minutes at about 50° C. or lower.

Now described are preparation examples and application examples of the bromine-impregnated activated carbon of the present invention.

REFERENCE EXAMPLE: ARBITRARILY SELECTED ACTIVATED CARBON

Preparation of Bromine-impregnated Activated Carbons

Activated carbon samples whose raw materials and properties are shown in Table 1 were dried in an air bath at 115° C. for three hours by an electric drier, and then cooled to room temperature in a desiccator. The samples were collected 100 g each.

Subsequently, each of the activated carbon samples was put in a three-liter glass conical flask. A layer of the activated carbon was flattened, on which three grams of silica wool was put. Then, ten grams of bromine of guaranteed reagent grade was dropped onto the silica wool, and the flask was shook and stirred to impregnate the activate carbon with vaporized bromine gas. Thus, Samples A to C were prepared. The impregnation amount of bromine was calculated by an increase of the weight of the sample collected after all bromine got carried by the activated carbon and the gas within the flask turned colorless and transparent.

TABLE 1

| Sample No. (Reference Example) | Form | Main Raw Material | BET Surface Area (m²/g) | Impregnation Amount of Bromine (g/100 g) |
|---|---|---|---|---|
| A | 4 to 8 mesh Crushed | Coconut Shell | 1010 | 9.8 |
| B | 4 mm φ Cylindrical | Coconut Shell | 1200 | 9.8 |
| C | 4 mm φ Cylindrical | Bituminous Coal | 1210 | 9.7 |

Dimethyl Sulfide Adsorption Characteristics

The bromine-impregnated activated carbons thus obtained were crushed and sieved with a 16 to 24 mesh and fed in glass columns of 15.6 mm inner diameter to form layers of 100 mm height (19.1 ml). Air having a relative humidity of 80% which contains 3 ppm dimethyl sulfide was passed at 40 cm/sec in the columns at 25° C.

The concentration (C) of dimethyl sulfide in the air at an outlet of each of the activated carbon layers and the concentration ($C_0$) of dimethyl sulfide in the air at an inlet to each of the activated carbon layers were measured by a gas chromatograph provided with an FPD detector. Time having passed until a breakthrough ratio $C/C_0$ reached 0.05 was counted for each of the activated carbons (as a breakthrough time). The results are shown in Table 2.

For comparison, the breakthrough time concerning dimethyl sulfide was counted using the respective bromine-unimpregnated activated carbons (A', B', C') in the same manner. The results are also shown in Table 2.

TABLE 2

| Sample No. | Breakthrough Time (hrs) | Sample No. | Breakthrough Time (hrs) |
|---|---|---|---|
| A | 15.5 | A' | 3.0 |
| B | 6.5 | B' | 4.0 |
| C | 35.0 | C' | 3.5 |

Analysis of Activated Carbons

Ash of the respective activated carbons was mixed with lithium borate and melted, and then dissolved in dilute nitric acid. The contents of Na, K, Mg, Ca, Zn, Fe and Cu, which are likely to form bromides and usually are contained in activated carbons, were determined by Atomic Absorption Spectrometry. The results are shown in Table 3.

TABLE 3

| | A' | B' | C' (g/100 g) |
|---|---|---|---|
| Na | 0.17 | 0.25 | 0.025 |
| K | 1.33 | 1.02 | 0.045 |
| Mg | 0.049 | 0.29 | 0.065 |
| Ca | 0.046 | 0.16 | 0.25 |
| Zn | 0.003 | 0.005 | 0.005 |
| Fe | 0.006 | 0.20 | 0.75 |
| Cu | 0.003 | 0.004 | 0.001 |

EXAMPLE 1: ACID-WASHED ACTIVATED CARBONS

Washing of Activated Carbons

A chloric acid of 5 wt %, 1,000 g, was added to 200 g of each of the respective bromine-unimpregnated activated carbons A', B' and C' used in the above Reference example. The resulting mixtures were boiled for 30 minutes and then the washing liquid was removed. Further, ion-exchange water was added thereto and then replacement of ion-exchange water was repeated five times. The resulting activated carbons after washing are referred to as A-1', B-1' and C-1'.

Further, the bromine-unimpregnated activated carbon A' and C' were washed only with ion-exchange water instead of chloric acid. The resulting activated carbons are referred to as A-2' and C-2'.

Preparation of Bromine-Impregnated Activated Carbons

The washed activated carbons obtained as described above were dried sufficiently and made into bromine-impregnated activated carbons (A-1, A-2, B-1, C-1 and C-2) as shown in Table 4 in the same manner as in Reference Example.

TABLE 4

| Sample No. (Example) | Washing | Main Material | BET Surface Area ($m^2/g$) | Impregnation Amount of Bromine (g/100 g) |
|---|---|---|---|---|
| A-1 | Chloric acid - Ion-exchange water | Coconut Shell | 1025 | 9.7 |
| A-2 | Ion-exchange water | Coconut Shell | 1020 | 9.8 |
| B-1 | Chloric acid - Ion-exchange water | Coconut Shell | 1235 | 9.8 |
| C-1 | Chloric acid - Ion-exchange water | Bituminous Coal | 1230 | 9.6 |
| C-2 | Ion-exchange water | Bituminous Coal | 1220 | 9.7 |

Dimethyl Sulfide Adsorption Characteristics

The dimethyl sulfide breakthrough time was counted for the prepared bromine-impregnated activated carbons in the same manner as in the Reference Example. The results are shown in Table 5.

The dimethyl sulfide breakthrough time was also counted for the corresponding bromine-unimpregnated samples (A-1', A-2', B-1', C-1' and C-2') in the same manner for control. The results are also shown in Table 5.

TABLE 5

| Sample No. (Example) | Breakthrough Time (hrs.) | Sample No. (for control) | Breakthrough Time (hrs.) |
|---|---|---|---|
| A-1 | 233.0 | A-1' | 3.0 |
| A-2 | 170.0 | A-2' | 3.0 |
| B-1 | 245.0 | B-1' | 4.0 |
| C-1 | 243.0 | C-1' | 3.5 |
| C-2 | 175.0 | C-2' | 3.5 |

Analysis of Activated Carbons

Ash of each of the bromine-unimpregnated activated carbons (A-1', A-2', B-1', C-1' and C-2') was analyzed on the contents of Na, K, Mg, Ca, Zn, Fe and Cu in the same manner as in the Reference Example. The results are shown in Table 6.

TABLE 6

| | A-1' | A-2' | B-1' | C-1' | (g/100 g) C-2' |
|---|---|---|---|---|---|
| Na | 0.012 | 0.015 | 0.013 | 0.004 | 0.017 |
| K | 0.027 | 0.13 | 0.025 | 0.005 | 0.008 |
| Mg | 0.005 | 0.015 | 0.004 | 0.007 | 0.031 |
| Ca | 0.004 | 0.040 | 0.009 | 0.020 | 0.13 |
| Zn | <0.001 | 0.002 | <0.001 | <0.001 | 0.004 |
| Fe | 0.001 | 0.005 | 0.019 | 0.025 | 0.25 |
| Cu | 0.001 | 0.003 | 0.002 | 0.001 | 0.001 |

EXAMPLE 2

Thermal Treatment of Activated Carbons

Activated carbons whose raw materials and properties are shown in Table 7, each 300 g, were thermally treated by a ring furnace at 850° C. with a flow of nitrogen at 5 liter/minute for 30 minutes. After the thermal treatment, the activated carbons were cooled with nitrogen gas.

Preparation of Bromine-impregnated Activated Carbons

The thermally treated activated carbons were dried by the electric drier at 115° C. for three hours, and then cooled to room temperature in the desiccator. The resulting activated carbons were collected 100 g each.

Subsequently, each of the activated carbons were put in a one-liter glass conical flask. About three grams of silica wool were put on flattened layers of the activated carbons, and then ten grams of bromine of the guaranteed reagent grade were dropped onto the silica wool. The flask was shook and stirred to impregnate the activated carbon samples with bromine. Thus, Samples D to F were prepared. The impregnation amount of bromine was calculated from an increase of the weight of the sample collected after the inside of the flask became colorless and transparent, and are shown in Table 7.

TABLE 7

| Sample | Form | Main Material | BET Surface Area ($m^2/g$) | Impregnation Amount of Bromine (g/100 g) |
|---|---|---|---|---|
| D | 4 mm φ Cylindrical | Coconut Shell | 1232 | 9.3 |
| E | 4 mm φ Cylindrical | Coal A | 1245 | 9.4 |
| F | 4 mm φ Cylindrical | Coal B | 1163 | 9.2 |

Dimethyl Sulfide Adsorption Characteristics

The bromine-impregnated activated carbons (Samples D to F) obtained as described above were crushed and sieved with the 16 to 24 mesh and put in glass columns having an inner diameter of 15.6 mm in layers of 100 mm thickness (19.1 ml). Air having a relative humidity of 80% which contained 3 ppm dimethyl sulfide was passed in the columns at a flow rate of 40 cm/sec at 25° C.

The time (the breakthrough time) having passed until the breakthrough ratio $C/C_0$ reached 0.05 was counted in the same matter as in Reference Example 1. The results are shown in Table 8.

TABLE 8

| Samples | Breakthrough Time (hrs) |
|---|---|
| D | 400 |
| E | 405 |
| F | 395 |

Determination of Surface Oxides in Activated Carbons

Samples of the respective bromine-impregnated activated carbons, 3 g each, were put in quartz columns of φ20×1,000 mm. The samples were fixed by sufficiently dried glass wool at their fronts and backs. The columns were set in an electric ring furnace. The columns were closed with rubber caps, which were provided with openings for letting nitrogen gas into the columns and openings for letting nitrogen gas out of the columns. The columns were heated to 100° C. with nitrogen gas being flown into the columns at a flow rate of 100 ml/minute. Subsequently, gas coming out of outlets was sent to two-liter tetra pak® and heated to 900° C. at a rate of 400° C. /hour. When reached 900° C., the temperature was maintained at 900° C. for 30 minutes. Then, the tetra pak® were taken off. The amount of collected gas was measured, and the total concentration of CO and $CO_2$ in the collected gas was determined by the gas chlomatograph with the FID detector provided with a methane conberter. Then the content of the surface oxides was calculated in terms of oxygen. Also, the content of surface oxides in the bromine-unimpregnated activated carbons before the impregnation with bromine was determined and calculated in the same way as D",E",F". The results are shown in Table 9.

TABLE 9

| Samples | Content of Surface Oxides in Terms of Oxygen (mg/g) |
| --- | --- |
| D | 9.3 |
| E | 8.29 |
| F | 10.21 |
| D" | 2.39 |
| E" | 2.03 |
| F" | 2.62 |

The activated carbons of Samples D to F had the contents of alkali metals and the like shown in Table 10.

TABLE 10

| | D | E | F | (g/100 g) |
| --- | --- | --- | --- | --- |
| Na | 0.011 | 0.022 | 0.02 | |
| K | 0.023 | 0.02 | 0.021 | |
| Mg | 0.006 | 0.025 | 0.05 | |
| Ca | 0.006 | 0.11 | 0.21 | |
| Zn | 0.001 | 0.003 | 0.003 | |
| Fe | 0.016 | 0.21 | 0.23 | |
| Cu | 0.001 | 0.001 | 0.001 | |

EXAMPLE 3

Preparation of Bromine-Impregnated Activated Carbon

Activated carbons which were not subjected to the thermal treatment but had the contents of alkali metals and the like shown in Table 12 were modified into bromine-impregnated activated carbons in the same manner as in Example 2. The results are shown in Table 11.

TABLE 11

| Sample | Form | Main Material | BET Surface Area (m²/g) | Impregnation Amount of Bromine (g/100 g) |
| --- | --- | --- | --- | --- |
| D' | 4 mm φ Cylindrical | Coconut Shell | 1225 | 9.4 |
| E' | 4 mm φ Cylindrical | Coal A | 1203 | 9.2 |
| F' | 4 mm φ Cylindrical | Coal B | 1131 | 9.6 |

TABLE 12

| | D' | E' | F' | (g/100 g) |
| --- | --- | --- | --- | --- |
| Na | 0.012 | 0.05 | 0.018 | |
| K | 0.03 | 0.015 | 0.038 | |
| Mg | 0.002 | 0.028 | 0.031 | |
| Ca | 0.005 | 0.11 | 0.13 | |
| Zn | 0.002 | 0.003 | 0.003 | |
| Fe | 0.016 | 0.21 | 0.16 | |
| Cu | 0.001 | 0.001 | 0.002 | |

Dimethyl Sulfide Adsorption Characteristics

The breakthrough time was determined for the bromine-impregnated activated carbons obtained as described above (Samples D' to F') in the same manner as in Example 2. The results are shown in Table 13.

TABLE 13

| Samples | Breakthrough Time (hrs) |
| --- | --- |
| D' | 255 |
| E' | 190 |
| F' | 285 |

Determination of Surface Oxides in Activated Carbons

Surface oxides in the bromine-impregnated activated carbons prepared from the activated carbons not having been subjected to the thermal treatment were analyzed in the same manner as in Example 2. The results are shown in Table 14.

TABLE 14

| Samples | Content of Surface Oxides in Terms of Oxygen (g/100 g) |
| --- | --- |
| D' | 29.02 |
| E' | 50.55 |
| F' | 26.00 |

According to the present invention, the bromine-impregnated activated carbon has improved adsorption characteristics to the alkyl sulfides, which have not been sufficiently removed by activated carbons prepared by the conventional techniques. Further, variations in the absorption characteristics can be reduced and the activated carbon can exhibit a stable performance in removing the alkyl sulfides.

What is claimed is:

1. A process for preparing bromine-impregnated activated carbon comprising the steps of:

reducing the content of any individual alkali metal, any individual alkali earth metal and iron in an activated carbon raw material to 0.3 wt % or lower to produce an activated carbon carrier; and impregnating the activated carbon carrier with bromine such that the content of bromine is not lower than 3 wt %.

2. A process according to claim 1, wherein the content of any individual alkali metal, any individual alkali earth metal and iron in the activated carbon raw material is reduced to 0.3 wt % or lower by treating an activated carbon raw material with water or with an acidic aqueous solution.

3. A process according to claim 1, further comprising the steps of thermally treating the activated carbon raw material at 500° C. to 1,100° C. in the absence of oxygen to produce an activated carbon carrier before the step of impregnating the activated carbon carrier with bromine.

4. A process for preparing a bromine-impregnated activated carbon having a content of surface oxide which is not higher than 2.5 wt % in terms of oxygen and the activated carbon is impregnated with bromine such that the content of bromine is not lower than 3 wt % comprising the steps of:

thermally treating an activated carbon raw material at 500° C. to 1,100° C. in the absence of oxygen to produce an activated carbon carrier; and impregnating the activated carbon carrier with bromine.

5. A process according to claim 4, wherein the content of a surface oxide in the activated carbon raw material before impregnated with bromine is not higher than 2.0 wt % in terms of oxygen.

* * * * *